United States Patent [19]
McQueen

[11] Patent Number: 4,899,584
[45] Date of Patent: Feb. 13, 1990

[54] FLUIDIC AMPLIFIER FOR SENSING FLUID MOTION

[75] Inventor: Malcolm M. McQueen, Fallbrook, Calif.

[73] Assignee: Fluid Components, Inc., San Diego, Calif.

[21] Appl. No.: 265,786

[22] Filed: Oct. 31, 1988

[51] Int. Cl.[4] .............................................. G01F 1/68
[52] U.S. Cl. ........................................... 73/204.21
[58] Field of Search ........... 73/204.21, 204.22, 204.16, 73/204.11; 138/39; 340/606

[56] References Cited

U.S. PATENT DOCUMENTS 3,366,942  1/1968  Deane ............................ 73/204.11
3,898,638  8/1975  Deane et al. ..................... 340/606
4,774,833  10/1988  Weibler et al. ................. 73/204.21

OTHER PUBLICATIONS

Catalog of Fluid Components, Inc. (1986).

Primary Examiner—Herbert Goldstein
Attorney, Agent, or Firm—Baker, Maxham, Jester & Meador

[57] ABSTRACT

A fluidic amplifier for sensing the motion of fluid. The amplifier comprises a heater probe, a reference probe and an active probe which is subject to influence of the heater probe under certain circumstances. A reinforced deflection vane is provided to cause signal level changes when fluid flow reaches a predetermined velocity.

11 Claims, 3 Drawing Sheets

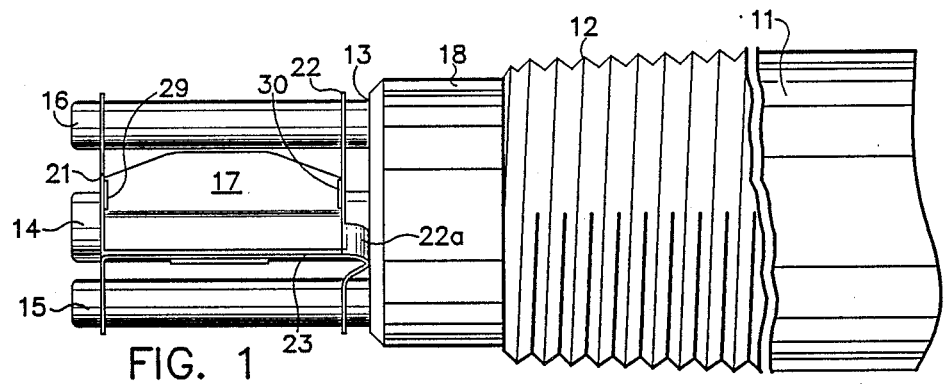
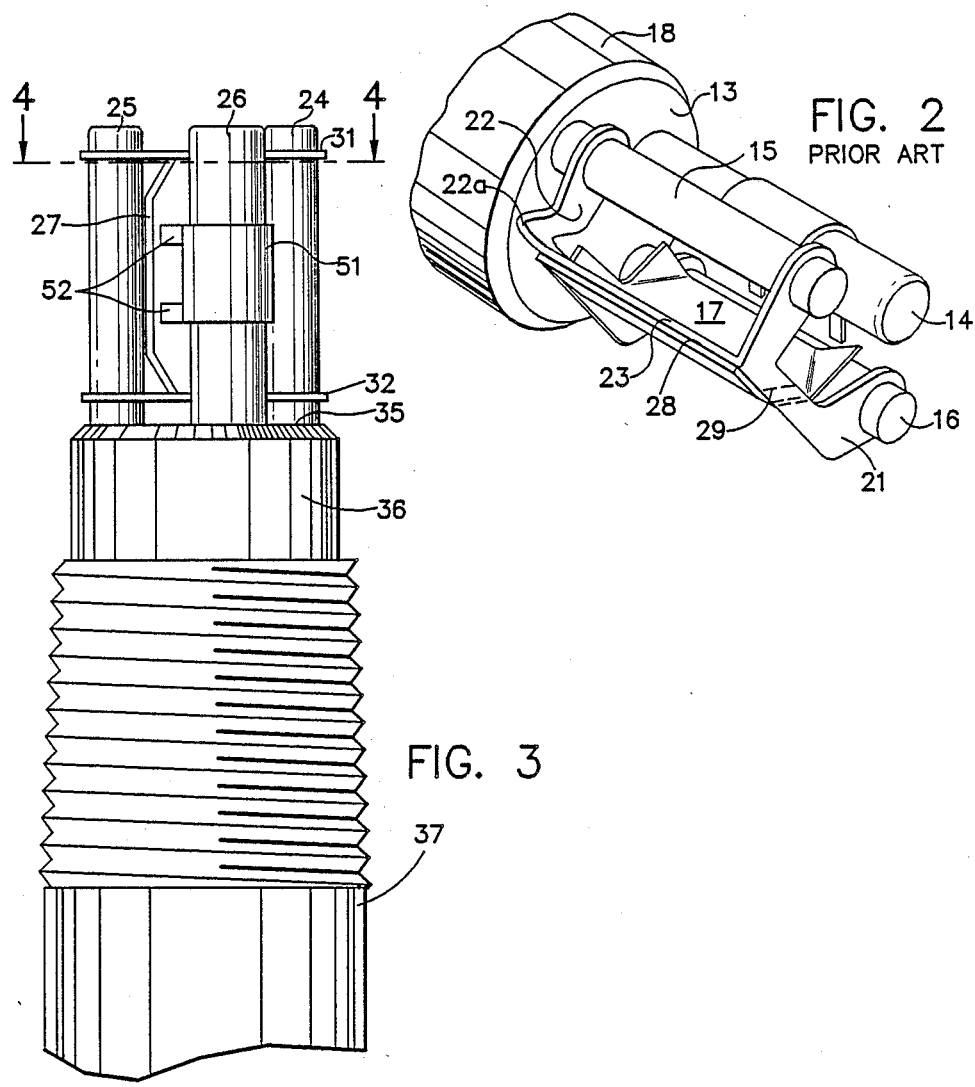
FIG. 1 PRIOR ART
FIG. 2 PRIOR ART
FIG. 3

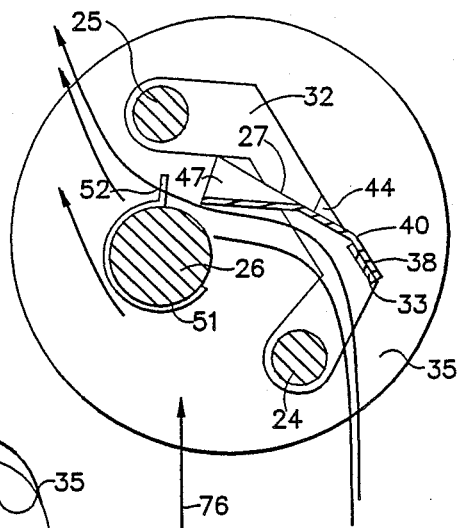
FIG. 4
FIG. 5
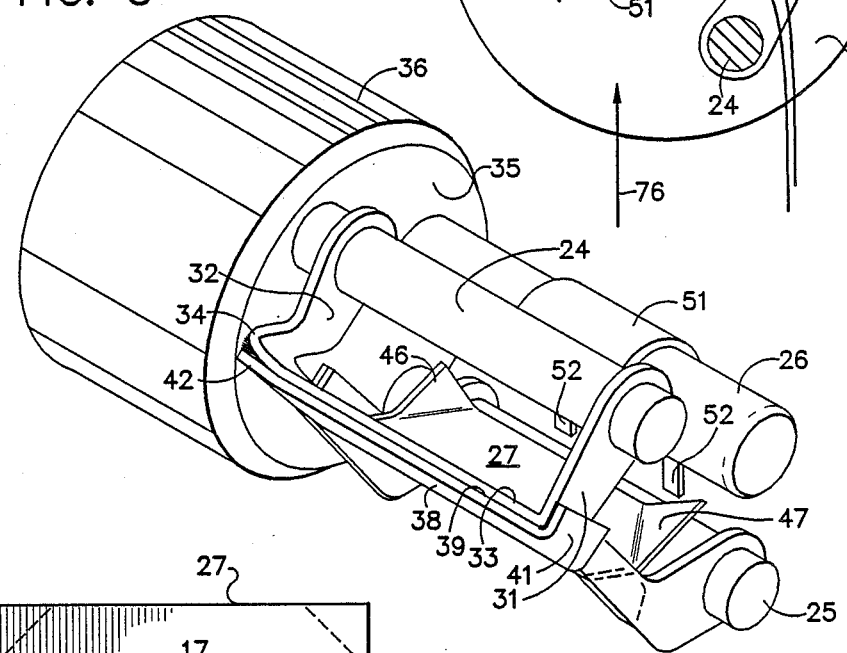
FIG. 6
PRIOR ART
FIG. 7
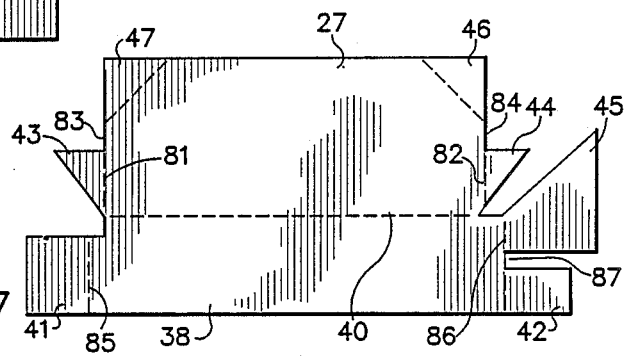

FLUIDIC AMPLIFIER FOR SENSING FLUID MOTION

FIELD OF THE INVENTION

This invention relates generally to temperature sensors and more particularly to a differential temperature fluid amplifier adapted for use in fluid motion and liquid level detectors.

BACKGROUND OF THE INVENTION

In many industrial and commercial fields there is a need for compact and versatile flow detectors which positively determine that a particular mass of fluid is flowing, has stopped flowing, or flows above a predetermined threshold level of flow velocity. Alternatively, such a device may be used to determine when the level of the liquid in a container has reached a predetermined height. This need is particularly strongly felt in the petroleum and commercial gas industries, which employ hundreds of thousands of miles of pipes, tubes, ducts and many other conduits to transport, and countless tanks to store enormous volumes of material in a variety of forms. These conduits and containers may be vertical, horizontal or inclined, and range in size from fractions of inches to many feet in diameter. The materials vary in composition from gases and highly reactive low-viscosity liquids to semi-solid, completely heterogeneous, corrosive mixtures of sand, mud, water and crude oil. The materials flowing in such conduits create a harsh environment.

Often the transport lines and tanks and the pumping equipment associated with them are unattended for long periods of time. Failure to note the halt in flow or the reduction below a certain predetermined flow velocity of one or more of the materials in them may be very costly and even could be catastrophic. Economic inflation and advances in technology have made, and will likely continue to make, such failures ever more costly and dangerous.

Devices have long been available for detecting and in some cases measuring, the rate of flow of fluids. The most common of these utilize the force exerted by the moving fluids against some object immersed in it to indicate or determine the rate of fluid motion. Regardless of the form chosen for the immersed object, for example, propeller, vane, piston, deflection arm, drogue or the like, all of these devices are subject to a number of serious shortcomings. Movable parts deteriorate after continued immersion for extended periods of time and become corroded or frozen in place after even brief contact with many fluids. Sealing and packing, always at least minor problems, become monumental tasks where moving parts are involved. Clogging, jamming and fouling frequently occur where the fluid contains any solids, tars or lacquers, or forms them through chemical reaction, evaporation or chemical decomposition. Mechanical deformation and fatigue induced breakdowns also plague this class of indicators. For all of the foregoing reasons, and in addition because the response rates and sensitivities in fluids of high density and viscosity are generally extremely low, particularly when these fluids are moving slowly, these devices are by and large wholly unsuitable for the detection of flow stoppage, reduction in flow velocity below a predetermined level, or changes in fluid level.

Another family of flow sensing devices operates on the Venturi principle, but these are wholly unsatisfactory for use with very dense and slow moving fluids. Furthermore, when the fluid is of high viscosity or contains solids, there is little chance of keeping the orifices, manometer tubes, bellows and other pressure sensing or conducting mechanisms free for sensing and consequently they are quickly rendered inoperative. Even when operating properly, these devices are unable to indicate positively the termination of fluid flow, or minimal changes in pressure because all of the above environmental factors influence the delicately balanced signals near and at the zero flow rate.

Examples of flow detectors employing differential temperature sensors are shown in U.S. Pat. Nos. 3,366,942 and 3,898,638. These devices have no moving parts and have proven satisfactory, at least in many circumstances where it is desirable to determine that the fluid flow has stopped. These devices, in the preferred form, generally employ a heater and two heat sensors with means for detecting differential heat responses between the sensors. The heater and the sensors are immersed in the fluid and positioned to permit the unobstructed flow of the fluid between the heater and the second sensor and are adapted so that when the fluid is flowing the heat generated by the heater and passing into the fluid is dissipated without heating either of the sensors. When the fluid is at rest the heater heats the second sensor through the fluid to a greater degree than the first sensor, thereby providing the differential temperature signal required.

SUMMARY OF THE INVENTION

Broadly speaking, this invention relates to differential temperature fluidic amplifiers for determining changes in fluid flow velocity, stoppage of fluid flow, or changes in fluid level in a container.

The device of this invention is particularly adapted to withstand high fluid velocities and shocks caused by such phenomena as water hammers and gushing flow as are more common in modern oil recovery systems. The amplifier of this invention is of the type mentioned above, having a heater and two sensors. A particular aspect of the invention is the provision of a relatively indestructible vane or baffle mounted in juxtaposition with the heater and the sensors, resulting in flowing fluid being diverted from the active sensor so that there is no influence thereon by the heater at moderate flow rates. The active and the reference sensors thus report the same temperature, thereby indicating that fluid is flowing.

Alternatively, in a tank, the amplifier can determine liquid level. It is likely that several fluidic amplifiers of this invention would be used in a storage tank to provide discrete readings of liquid level.

BRIEF DESCRIPTION OF THE DRAWING

The objects, advantages and features of this invention will be more readily appreciated from the following detailed description, when read in conjunction with the accompanying drawing, in which:

FIG. 1, a side view of a prior art sensor of the type of the invention;

FIG. 2 is a rotated perspective view of the prior art sensor of FIG. 1;

FIG. 3 is a side view of the present invention;

FIG. 4 is a sectional end view of the embodiment of FIG. 3 taken along cutting plane 4—4;

FIG. 5 is a rotated perspective view of the invention of FIG. 3;

FIG. 6 is a baffle of the prior art in developed form;

FIG. 7 is the baffle of the present invention in developed form; and

DETAILED DESCRIPTION OF A PREFERRED EMBODIMENT

Figure 8:
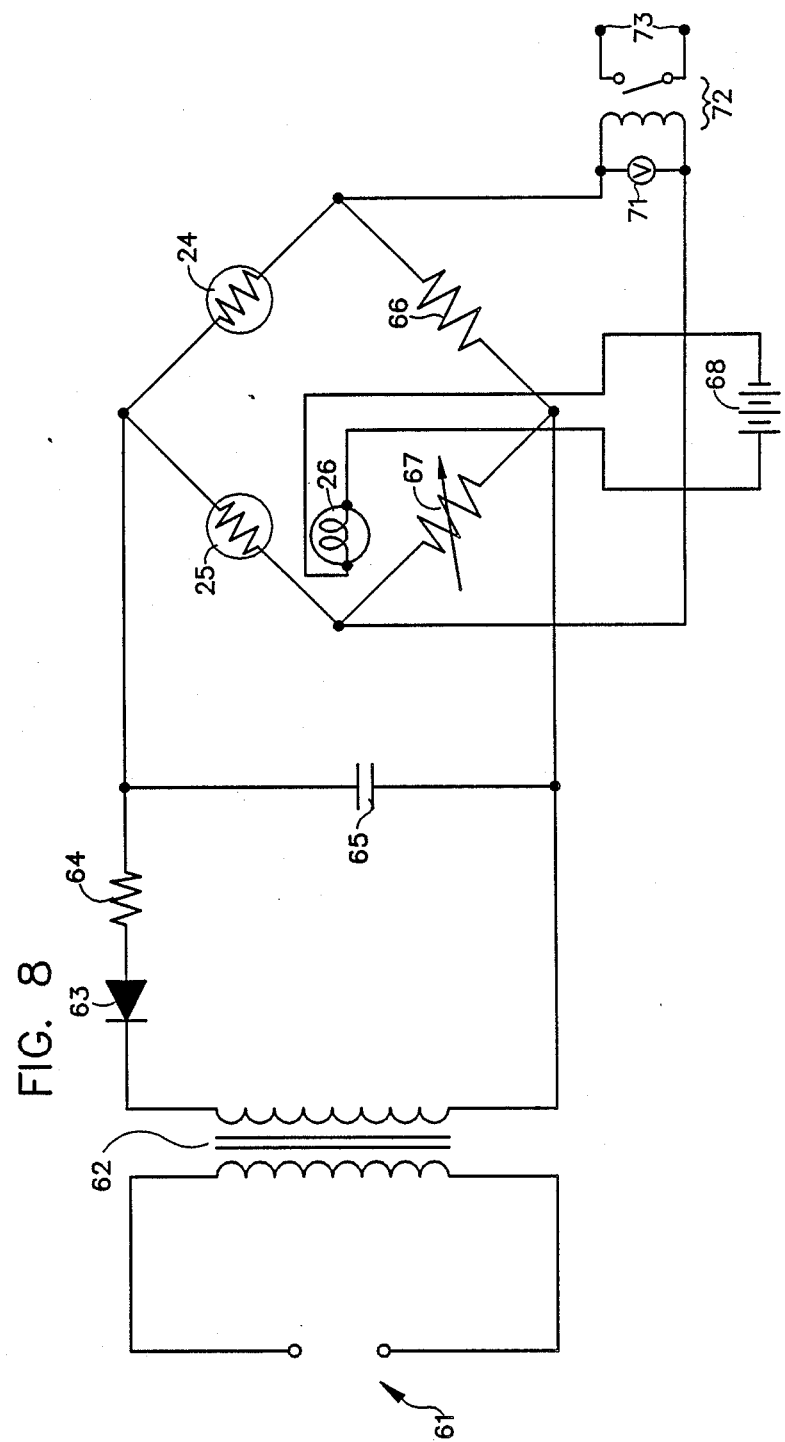
FIG. 8 is a basic circuit diagram with which the heater and sensor probes of the invention could be connected.

With reference now to the drawing, and more particularly to FIGS. 1 and 2, there is shown the prior art differential temperature fluidic amplifier. Housing 11 is typically provided with threads 12 by means of which the housing is connected in the side wall of a container or conduit. Housing 11 may contain the electronic circuitry shown in FIG. 8 in addition to providing a mounting means for the heater and sensor elements. Extending parallel to the longitudinal axis of the housing, from end face 13 of cylindrical extension 18, are heater element probe 14, reference sensor probe 15 and active sensor probe 16. The external elements of the sensor probes are thermowells enclosing sensors such as resistance temperature detectors. The purposes and functions of each of these elements is described in previously mentioned U.S. Pat. Nos. 3,366,942 and 3,898,638 so they need not be discussed in detail here. Deflector vane or baffle 17 is secured to mounting brackets 21 and 22 along upper bridge surface 23 extending between them by brazing 28 or by other suitable means. Brackets 21 and 22 extend between and are secured to sensor probes 15 and 16. Further support for bracket 22 is provided by reverse bend 22a which is brazed to end face 13. The opposite edges of vane 17 between and closely adjacent brackets 21 and 22 are secured to the respective brackets by brazing 29 and 30.

It has been found that the fluid flow velocity existing in many pipes relating to the petroleum industry can become so great that baffle 17 of the prior art sensor is literally torn from its mounting brackets. Another stress factor is the existence of water hammers caused by the use of reciprocating pumps operating at high speeds to improve oil well production rates. There may well be other causes of sudden force being applied to the baffle.

The present invention was conceived and reduced to practice in an effort to overcome the tendency of the prior art devices to be rendered inoperative by relatively high fluid flow velocities, water hammers and the like. Details of the invention are shown in FIGS. 3–5 and 7. Much like the prior art device shown in FIGS. 1 and 2, the invention of FIGS. 3–5 and 7 has reference sensor 24, active sensor 25 and heater 26, only the external shields of which are shown. Baffle 27 is secured to the device, typically by means of bracket members 31 and 32 mounted to the sensors. Bracket members 31 and 32 are bridged by strap member 33. Bracket 32 is formed with reverse bend portion 34 which is closely adjacent or in contact with face 35 of cylindrical extension 36 of housing 37. As shown in the drawing, both bracket members 31 and 32 are formed with holes through which sensor shields 24 and 25 extend. Bracket members 31 and 32 are then anchored to the respective sensor housings by such means as brazing. Additionally, bend portion 34 is secured such as by brazing to face 35 of the housing.

The sensor of this invention is frequently required to detect flow in relatively small pipes with a small clear flow area. Because of the typical size limitations, there is a very restricted area available for bracing or reinforcing the sensor baffle to prevent it from being destroyed. It was therefore deemed to be necessary to obtain the desired reinforcement without presenting an externally enlarged structure which could further affect or impede fluid flow.

Baffle 27 is secured to the sensor end of housing 37 by means of several elements to enable it to withstand stress from high flow velocities, water hammers and the like and continue to perform its intended function. Base 38 of the baffle is closely adjacent and parallel with strap 33 and is secured thereto by such means as brazing 39. Tab 41 is an extension of base 38 farthest from face 35 of the housing, and is bent to extend over the external portion of bracket member 31 is and secured thereto. Similarly, tab 42 extends beyond the flat upper side of strap 33 toward face 35. This tab is parallel with base 38 or it may be bent slightly downward and is secured to the upper portion of bend 34, and to face 35 of the housing, by such means as brazing. Baffle 27 is bent inwardly toward heater element 26 at bend line 40 (FIG. 4) where it extends beyond the width of strap 33. It also extends generally toward active sensor 25. Flap portions 43 and 44 of baffle 27 are bent upwardly in a direction opposite to the direction of bend of the baffle from base 38. These flaps are secured to the inside or facing sides of bracket members 31 and 32 by such means as brazing, as shown in the drawing. A further tab 45 extends from base 38 of baffle 27 just forward of tab 42, is bent down to a position parallel with a portion of bracket member 32 and is secured thereto by such means as brazing. The distal end of baffle 27 is formed with focusing flaps 46 and 47 as shown.

The forces acting on the sensor from flowing fluid can be seen in FIG. 4. With general flow direction indicated by arrow 76, significant forces can be applied to baffle 27. In the prior art unreinforced baffle only edge connections 29 and 30 added to the face braze connection 28 to bridge surface 23. When fluid flow forces become great, the edge brazes tend to tear loose and the resultant torque applied to baffle 17 results in destruction of the baffle/bridge structure.

As originally designed, the unreinforced baffle (FIGS. 1, 2, and 6) was entirely satisfactory. As economic conditions changed, and particularly during the oil boycott of several years past, increased production of oil from domestic fields became a high priority. With higher production came higher stresses on all equipment in the production of crude oil and the phenomena manifested itself in this case on failure of the unreinforced thin gauge metal used for fabricating prior art baffle 17.

As mentioned above, owing to the typically restricted area in the pipe at the point where the flow sensor is installed, it was not possible to put an unlimited amount of metal into the baffle for strengthening it against the newly generated high stresses. A significant amount of research, development and testing have gone into the structure of the low obstruction reinforced baffle of this invention.

The invention adds compressive tabs 43 and 44 which serve to greatly enhance the strength of the mounting of baffle 27 to brackets 31 and 32. Tab 45 is more of a tension member while tabs 41 and 42 are anchoring members between base 38 of the baffle and bridge member 33. These relatively small elements, at least some of them combined, increase the ability of the baffle structure to withstand flow forces many times greater than was possible with the prior art device.

The baffle of the invention is shown developed in FIG. 7 and may be compared with the representation of the prior art baffle in FIG. 6. Bend lines 81 and 82 for tabs 43 and 44 are shown in line with outside edges 83 and 84 of the baffle. However, bend line 85 for tab 41 is parallel but spaced from edge 83 and bend line 81 by the thickness of bracket 31. Similarly, bend line 86 is parallel but spaced from edge 84 and bend line 82 by the thickness of bracket 32. Space 87 between tabs 42 and 45 is provided to ensure clearance between the two tabs which connect to bracket 32 differently from each other.

Collar 51 is secured to heater element 26 in a thermally conductive manner. The collar is formed with two tabs 52 extending directly toward active sensor 25. This configuration accentuates the transfer of heat by convection from the heater to the active sensor when the fluid in which the sensors and heater are immersed is quiescent or is flowing below the threshold velocity.

It can easily be appreciated from FIG. 4 that when the sensor element and heater are immersed in non-moving or quiescent fluid, the active sensor, being directly above and closer to the heater, is affected by the heat rising in convective currents from heater element 26 to a much greater degree than is reference sensor 24. Thus the temperature differential, when operated upon by the electronic circuitry of FIG. 7, will indicate the still condition of the fluid. When the fluid starts moving, that fluid which comes in contact with or near contact with heater 26 is deflected by baffle 27 laterally away from active sensor 25 so that after a predetermined flow velocity is established, the fluid temperature surrounding active sensor 25 is at about the same temperature as is the fluid surrounding reference sensor 24. This will indicate that fluid is flowing above a predetermined velocity, which is one of the main purposes of the sensor.

Changes in flow velocity directly affect the extent to which heat is dissipated and, in turn, the temperature differential between the sensors. This differential decreases as flow velocity increases, thereby cooling heated or active sensor 25. This differential is electronically converted into an output signal which can be used to provide a predetermined indication at any specified velocity set point. For example, an operator may want to know when fluid flow velocity has dropped below a certain level, whatever that level may be, and commensurately, when fluid is flowing above the critical threshold level. This sensor, by adjusting the spacing relationship between the heater and the sensor elements and the position and shape of the baffle, as well as the size and location of collar 51 with tabs 52, can be made to show fluid flow only beyond a certain fluid velocity. That flow velocity may be substantially higher than is the expected flow in which the prior art sensor was intended to function. In addition, or alternatively, the flow threshold may be modified within the circuitry connected to the sensors.

Another use of the present invention is to determine liquid level in a storage container. Several sensors of FIG. 3 may be installed in the side or end of a storage tank at different levels. It is known that the temperature differential between the active and the reference sensors is different when the heater and sensors are in still air as opposed to when they are in still fluid. Thus it is possible to determine whether or not both sensors are immersed or are dry. Alternatively, if the fluid level has reached the reference sensor only, and not the active sensor, there would be another characteristic temperature differential between them. In this way, with one or several such sensors in a tank, liquid level can be monitored. Of course it is possible to use only one such sensor at a critical level about which the operator wants to know certain facts. A single sensor may be able to provide sufficient information for certain purposes. All process media exhibit different abilities to transfer heat. Thus the instrument can be specifically calibrated to sense an interface between any immiscible products, including liquids, gases, slurries and foam, regardless of their other physical properties.

The circuit of FIG. 8 is a simplified diagram showing the basic electrical circuitry which may accompany the sensor and heater configuration shown. Of course, many other circuit configurations are possible, and the circuit may be much more sophisticated if desired. Basically, the circuit comprises a power source 61 which may be a conventional source of 110 volt AC. If desired, the incoming current may be converted to DC. The circuit also includes a common line isolation transformer 62, a typical rectifier 63 which is a semiconductor diode which, acting through resistor 64, serves to rectify the high frequency pulses and thereby charge capacitor 65 with a fixed polarity. A Wheatstone bridge is formed as part of the circuit and includes the resistance wire temperature sensors of probes 24 and 25 balanced against fixed resistance 66 and variable resistance 67, respectively. Voltmeter 71 may be connected across the bridge to give a visual indication when the bridge becomes unbalanced or it may be placed across sensor element 25, which may be a thermistor, to directly measure the temperature of the material in which it is immersed. Note that the voltmeter may equally be a galvanometer, ohmmeter or other suitable current or voltage detecting or measuring device which may be connected across the bridge to give the desired visual indication. In addition, if desired, relay switch 72 may also be connected across the bridge. Leads 73 from the relay switch may be connected to any desired auxiliary warning device, such as a light or an alarm, or to a secondary operational circuit, such as one activating a standby pump or automated valve system or the like. A separate source 68 of current for heater 26 is shown although power source 61 could easily be used to power the heater also. The functional aspects of the invention have been described and it is believed to not be necessary to describe the operation of the FIG. 8 circuit detail in conjunction with the sensors and heater.

It is important to note the distinction between the structure of the invention and that of the prior art as shown in FIGS. 1, 2 and 6. The prior art bracket members and their connection to the sensor housings and to face 13 of main housing 11 are substantially the same as in the present invention. However, it is important to note that baffle 17 of FIG. 1 is secured primarily by means of brazing 28 along strap 23 bridging bracket elements 21 and 22 with only opposite edges brazed for a short distance along the sides of the deflector vane as they lie closely adjacent the inside surfaces of brackets 21 and 22. As stated previously, relatively high flow velocities of the fluid in which the sensor is immersed could cause the baffle aspect of the sensor to be torn off and its effect to be destroyed. It was determined to be important not to change the basic configuration of the sensors and the deflection vane, while significantly strengthening the entire sensor apparatus. By means of the present invention, fluid flow many times faster than the fluid flow for which the prior art sensor is intended can easily be accommodated without deleterious effects. Similarly, pressure pulses and water hammer effects can also be withstood.

In view of the above description, it is likely that modifications and improvements which are within the scope of the appended claims will occur to a person skilled in the art. Of course, it would be possible to make the element connections between the baffle, the mounting brackets, the sensors and the heater element by means of welding as opposed to brazing, or by some other appropriate means. It is also conceivable that adequate reinforcement could be obtained by at least doubling the thickness of baffle 17 of FIGS. 1 and 6 from 0.03 inch to 0.06 inch. The addition of thickness would provide greater surface area for the brazing connection between the baffle and brackets 21 and 22 with bridge 23 therebetween.

What is claimed is:

1. A fluidic amplifier for sensing changes in fluid position, said amplifier comprising:
    a housing;
    a heater probe extending from said housing and adapted to be connected to a source of energy;
    a reference sensor probe extending from said housing and spaced from said heater probe by a first predetermined distance;
    an active sensor probe extending from said housing and spaced from said heater probe and from said reference probe by a second and a third predetermined distance, respectively;
    bracket means mounted to said amplifier;
    baffle means mounted to said bracket means, and baffle means being positioned generally between said active sensor probe and said reference sensor probe; and
    strength reinforcing means integrally formed with said baffle means, said reinforcing means being so configured as to make its mounting to said bracket means of suitable strength while not interfering with the fluid flow path, said reinforcing means comprising a plurality of tab means extending from said baffle means, said tab means being fixed to said bracket means;
    said amplifier being adapted to be positioned with said probe oriented transversely with respect to the normally expected direction of motion of the fluid to be monitored, said active sensor probe being generally downstream from said heater probe;
    said baffle means being shaped and configured to direct moving fluid passing said heater probe away from said active sensor probe.

2. The fluidic amplifier recited in claim 1, wherein said tab means are so shaped and configured and connected to said bracket means so as to provide resistance to overcome both tension and shear and compression forces induced on said baffle means during periods of relatively high fluid motion and resulting pressure against said baffle means.

3. The fluidic amplifier recited in claim 1, wherein said bracket means comprises an inner bracket and an outer bracket spaced from said inner bracket, said bracket means extending between said sensor probes with a strap extending between said inner and outer brackets.

4. The fluidic amplifier recited in claim 3, wherein said baffle means is mounted to said strap and to said brackets.

5. The fluidic amplifier recited in claim 4, wherein said baffle means has a first portion overlying and positively secured to said strap, said tab means comprising:
    a first tab extending outwardly from said first portion away from said housing and being bent down along a side of said outer bracket and secured thereto; and
    a second tab extending inwardly from said first portion toward said housing and being secured to said inner bracket.

6. The fluidic amplifier recited in claim 4, wherein said baffle means has a first portion overlying and positively secured to said strap and a second portion extending generally toward said heater probe between said inner and outer brackets, said tab means comprising:
    a first inner tab integral with said baffle means second portion extending parallel to a side of said inner bracket closely adjacent said second portion and positively secured thereto; and
    an outer tab integral with said baffle means second portion extending parallel to a side of said outer bracket closely adjacent said second portion and positively secured thereto.

7. The fluidic amplifier recited in claim 6, said tab means further comprising a second inner tab integral with said baffle means extending parallel to said first inner tab and on a side of said inner bracket opposite to the side to which said first inner tab is secured, said second inner tab being secured to said inner bracket.

8. The fluidic amplifier recited in claim 7, said tab means further comprising:
    a first tab extending outwardly from said first portion away from said housing and being bent down along a side of said outer bracket and secured thereto; and
    a second tab extending inwardly from said first portion toward said housing and being secured to said inner bracket.

9. The fluidic amplifier recited in claim 1, wherein said means for reinforcing the strength of said baffle means is shaped and configured so as to have no significant effect on the flow of the fluid passing said amplifier.

10. A fluidic amplifier for sensing changes in fluid position, said amplifier comprising:
    a housing;
    a heater probe extending from said housing and adapted to be connected to a source of energy;
    a reference sensor probe extending from said housing and spaced from said heater probe by a first predetermined distance;
    an active sensor probe extending from said housing and spaced from said heater probe and from said reference probe by a second and a third predetermined distance, respectively;
    bracket means mounted to said amplifier;
    said bracket means comprising an inner bracket and an outer bracket spaced from said inner bracket, said inner and outer brackets extending between said sensor probes with a strap extending between said inner and outer brackets;
    baffle means having a first portion overlying and positively secured to said strap and a second portion extending toward said heater probe between said inner and outer brackets so as to be generally between said active sensor probe and said reference sensor probe;

strength reinforcing means integrally formed with said baffle means, said reinforcing means being so configured as to make its mounting to said bracket means of suitable strength while not interfering with the fluid flow path;

said strength reinforcing means comprising a plurality of tab means extending from said baffle means, said tab means comprising:

a first inner tab integral with said baffle means second portion extending parallel to a side of said inner bracket closely adjacent said second portion and positively secured thereto; and an outer tab integral with said baffle means second portion extending parallel to a side of said outer bracket closely adjacent said second portion and positively secured thereto;

said tab means further comprising a second inner tab integral with said baffle means extending parallel to said first inner tab and on a side of said inner bracket opposite to the side to which said first inner tab is secured, said second inner tab being secured to said inner bracket;

a first tab extending outwardly from said first portion away from said housing and being bent down along a side of said outer bracket and secured thereto; and a second tab extending inwardly from said first portion toward said housing and being secured to said inner bracket;

said amplifier being adapted to a positioned with said probe oriented at about a 90° angle with respect to the normally expected direction of motion of the fluid to be monitored, said active sensor probe being generally downstream from said heater probe; and said baffle means being shaped and configured to direct moving fluid passing said heater probe away from said active sensor probe.

11. The fluidic amplifier recited in claim 10, wherein said means for reinforcing the strength of said baffle means is shaped and configured so as to have no significant effect on the flow of the fluid passing said amplifier.

* * * * *